(12) United States Patent
Chen et al.

(10) Patent No.: US 7,774,523 B2
(45) Date of Patent: Aug. 10, 2010

(54) INTERFACE SWITCH SYSTEM FOR SIMULTANEOUSLY CONNECTING MULTIPLE I/O DEVICES

(75) Inventors: Sung-Chung Chen, Taipei County (TW); Chang-Yu Chung, Taipei County (TW)

(73) Assignee: Aten International Co., Ltd. (TW)

( * ) Notice: Subject to any disclaimer, the term of this patent is extended or adjusted under 35 U.S.C. 154(b) by 578 days.

(21) Appl. No.: 11/635,964

(22) Filed: Dec. 7, 2006

(65) Prior Publication Data

US 2007/0083619 A1    Apr. 12, 2007

Related U.S. Application Data

(63) Continuation-in-part of application No. 10/813,066, filed on Mar. 31, 2004, now Pat. No. 7,281,067.

(51) Int. Cl.
*G06F 3/00* (2006.01)
*G06F 13/12* (2006.01)
*G06F 1/16* (2006.01)
*G05B 11/01* (2006.01)

(52) U.S. Cl. .......... 710/62; 710/2; 710/5; 710/63; 710/72; 700/19; 361/679.4

(58) Field of Classification Search .......... None
See application file for complete search history.

(56) References Cited

U.S. PATENT DOCUMENTS 4,687,275 A    8/1987  Ramisch et al.
RE037,296 E    7/2001  Peterson
6,609,034 B1 *    8/2003  Behrens et al. ......... 700/19
6,671,756 B1 *    12/2003  Thomas et al. ......... 710/73
6,948,980 B2    9/2005  Xiang et al.

(Continued)

FOREIGN PATENT DOCUMENTS

CN    1602473 A    3/2005
WO    03/042844 A1    5/2003

OTHER PUBLICATIONS

Office Action by the China State Intellectual Property Office in counterpart Chinese patent application No. 2007101997050, Dec. 5, 2008.

*Primary Examiner*—Alan Chen
(74) *Attorney, Agent, or Firm*—Chen Yoshimura LLP (57) ABSTRACT

A switch system may include a switch circuitry, an external housing for the switch circuitry, a number of first connector ports, and a second connector port. The switch circuitry is configured for coupling to input and output interfaces of the computers and is configured for switching a set of input and output interface couplings to one of the computers. The first connector ports are mounted on the housing. Each of the first connector ports is coupled to the switch circuitry for providing couplings to the computers. Each of the first connector ports has no less than sixteen electrical contacts for providing couplings to a display interface, an input device interface, and an audio interface. The second connector port is mounted on the housing. The second connector port is coupled to the switch circuitry for providing the set of input and output interface couplings, and the second connector port include electrical contacts for a display device, an input device, and an audio device.

21 Claims, 6 Drawing Sheets

U.S. PATENT DOCUMENTS

| | | |
|---|---|---|
| 7,035,112 B2 | 4/2006 | Chen |
| 7,281,067 B2 | 10/2007 | Chen |
| 7,448,917 B2 | 11/2008 | Liao et al. |
| 2002/0084988 A1 | 7/2002 | Kuo |
| 2003/0188049 A1 | 10/2003 | Dickens |
| 2004/0088468 A1 | 5/2004 | Hasegawa |
| 2005/0066000 A1* | 3/2005 | Liaw et al. .................. 709/204 |
| 2005/0138245 A1 | 6/2005 | Chen |

* cited by examiner

INTERFACE SWITCH SYSTEM FOR SIMULTANEOUSLY CONNECTING MULTIPLE I/O DEVICES

CROSS-REFERENCE TO RELATED APPLICATIONS

This application is a continuation-in-part application of and claims priority from U.S. patent application Ser. No. 10/813,066, entitled "KVM Switch Cable", filed on Mar. 31, 2004 now U.S. Pat. No. 7,281,067. The U.S. patent application Ser. No. 10/813,066 application was published as Publication Number US 2005-0138245 A1.

FIELD OF THE INVENTION

The present invention relates to a switch system for computer interfaces, such as input and output interfaces. More particularly, the present invention relates to a computer input and output switch system, including a switch circuitry, connectors and switch system cables.

BACKGROUND OF THE INVENTION

Today, more and more users desire access to two or more computers, such as desktop computers, laptop computers, or other processing devices, either through direct access or through wired or wireless networks. To facilitate operation of multiple computers, interface switches are necessary to allow a user to operate two or more computers with one or more common or shared peripheral devices. Examples of shared peripheral devices may include a keyboard, a mouse, and a touchpad, a display, a projector, a printer, and storage devices such as a hard drive, an optical drive, and a memory device or memory card.

Traditional switches are limited to the specifics of certain interfaces, such as PS/2 interfaces for keyboards and mice and VGA interfaces for monitors. Many switch designs are limited to specific connectors limiting other choices of different interface protocols and interface devices.

BRIEF SUMMARY OF THE INVENTION

An example consistent with the present invention may provide a switch system configured for coupling to two or more computers. The switch system may include switch circuitry, an external housing for the switch circuitry, a number of first connector ports, and a second connector port. The switch circuitry is configured for coupling to input and output interfaces of the computers and is configured for switching a set of input and output interface couplings to one of the computers. The first connector ports are mounted on the housing. Each of the first connector ports is coupled to the switch circuitry for providing couplings to the computers. Each of the first connector ports has no less than sixteen electrical contacts for providing couplings to a display interface, an input device interface, and an audio interface. The second connector port is mounted on the housing. The second connector port is coupled to the switch circuitry for providing the set of input and output interface couplings, and the second connector port include electrical contacts for a display device, an input device, and an audio device.

An example consistent with the present invention may provide a switch system configured for coupling to two or more computers. The switch system may include a switch circuitry, an external housing for the switch circuitry, a number of first connector ports, a second connector port, and a switch interface. The switch circuitry is configured for coupling to input and output interfaces of the computers and is configured for switching a set of input and output interface couplings to one of the computers. The first connector ports are mounted on the housing. Each of the first connector ports has no less than sixteen electrical contacts and no more than twenty-four electrical contacts for providing couplings to a display interface and an input device interface. The second connector port is mounted on the housing. The second connector port is coupled to the switch circuitry for providing the set of input and output interface couplings, and the second connector port include electrical contacts for a display device and an input device. The switch interface is coupled with the switch circuitry for effecting a selection of one of the computers that the set of input and output interface couplings is coupled to.

A further example consistent with the present invention may provide a switch system cable. The cable may include two ends and a conductive cable coupled between the two ends. The first end has a first cable connector configured for coupling to a first connector port of a switch system, and has no less than sixteen electrical contacts for providing connections to a display interface, an input device interface, and an audio interface. The second end has connectors configured for coupling to input and output interfaces of a computer. The conductive cable provides no less than sixteen independent, conductive connections between the first end and the second end.

Still another example consistent with the present invention may provide a switch system. The switch system may include a switch circuit, an external housing, and no less than eight first connector ports, and a second connector port. The switch circuitry is configured for being coupled to input and output interfaces of the computers and may be configured for switching a set of input and output interface couplings to one of the computers. The external housing may have a maximum height of no more than approximately 1.75 inches. The first connector ports are mounted on the housing, and each of the first connector ports may be coupled to the switch circuitry for providing couplings to the computers. Additionally, each of the first connector ports has no less than sixteen electrical contacts for providing couplings to a display interface, an input device interface, and an audio interface. The second connector port is mounted on the housing and may be coupled to the switch circuitry for providing the set of input and output interface couplings. Additionally, the second connector port has electrical contacts for a display device, an input device, and an audio device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Examples consistent with the present invention may provide switch systems configured for coupling to two or more computers and switch system cables configured for providing the couplings. In some examples, the switch system may provide connectors that provide connections to display, input, and audio interfaces. In some other examples, the switch system may provide connectors that provide connections to display, input, and computer peripheral interfaces. The computer peripheral interface may include a universal serial bus interface for sharing other peripheral devices and/or an audio interface. The switch system may provide a switch interface coupled with a switch circuitry for effecting a selection of a computer that a user wishes operate. In one example, the switch system may provide connectors each having 16 or more electrical contacts. Examples consistent with the present invention may also provide switch system cables configured for providing connections to display, input, and audio interfaces. In one example, the switch system cable may provide a connector having 16 or more electrical contacts for interface couplings.

Figure 1:
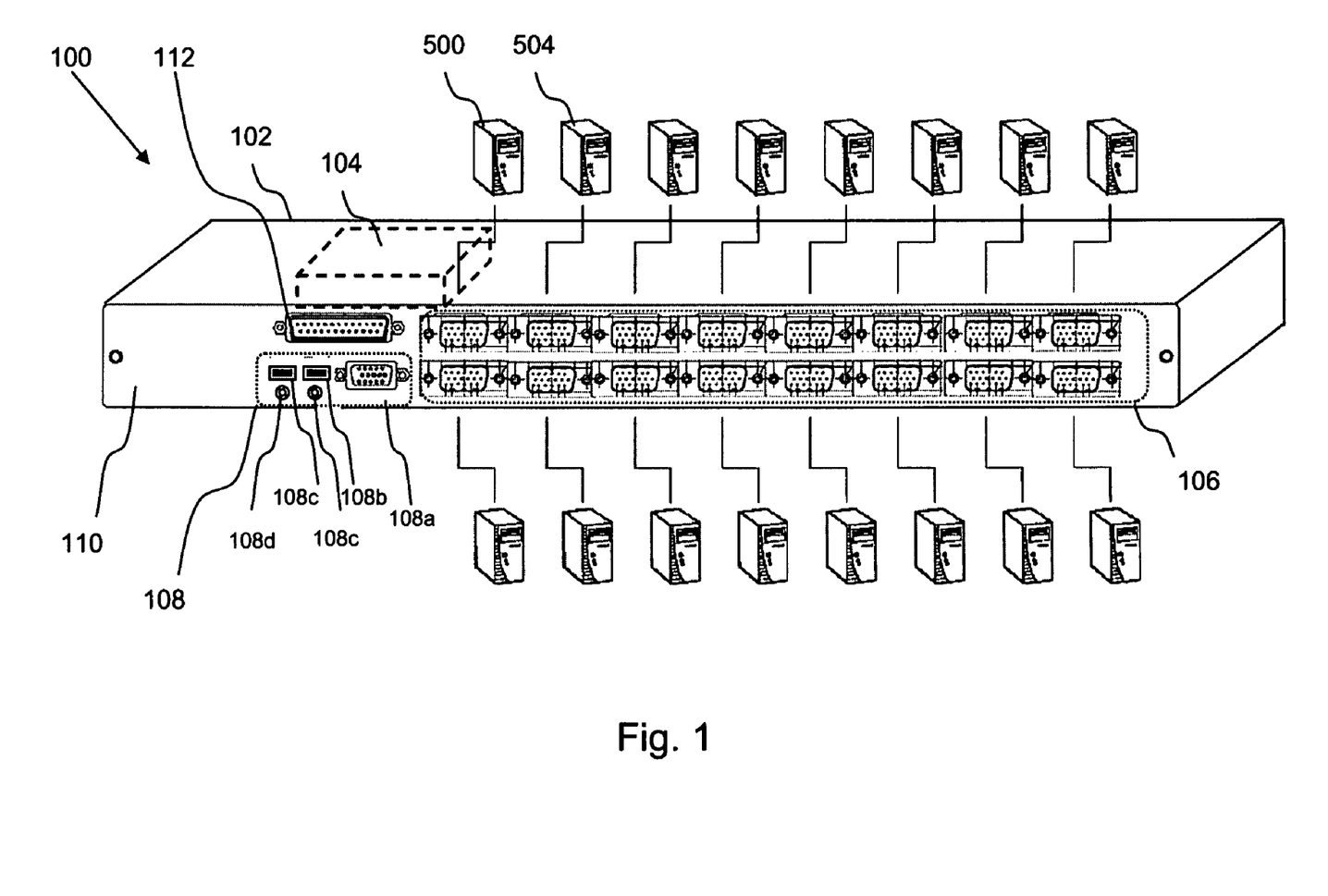
FIG. 1 illustrates an example of an interface switch system 100 consistent with the present invention.

FIG. 1 illustrates an example of an interface switch system 100 consistent with the present invention. The switch system 100 is configured for coupling to two computers 500 and 502 or more computers as illustrated, and the computers may share input devices, output devices, and/or other peripheral devices by allowing the switching of one or more interface couplings. One or more computer peripheral interfaces provided by the switch system may include a universal serial bus interface and/or an audio interface. Referring to FIG. 1, the switch system 100 may include an external housing 102 with a switch circuitry 104 (shown in dashed lines) therein, a number of first connector ports 106 for providing couplings to the computers, and a second connector port 108 for providing a set of input and output interface couplings.

Referring to FIG. 1, the external housing 102 is for the switch circuitry 104 and may cover or enclose part or the entire switch circuitry 104. In some example, a connector panel 110 may be provided as a part of the external housing or separate from the external housing to allow the mounting of some or all of the connectors on the connector panel 110.

Figure 3:
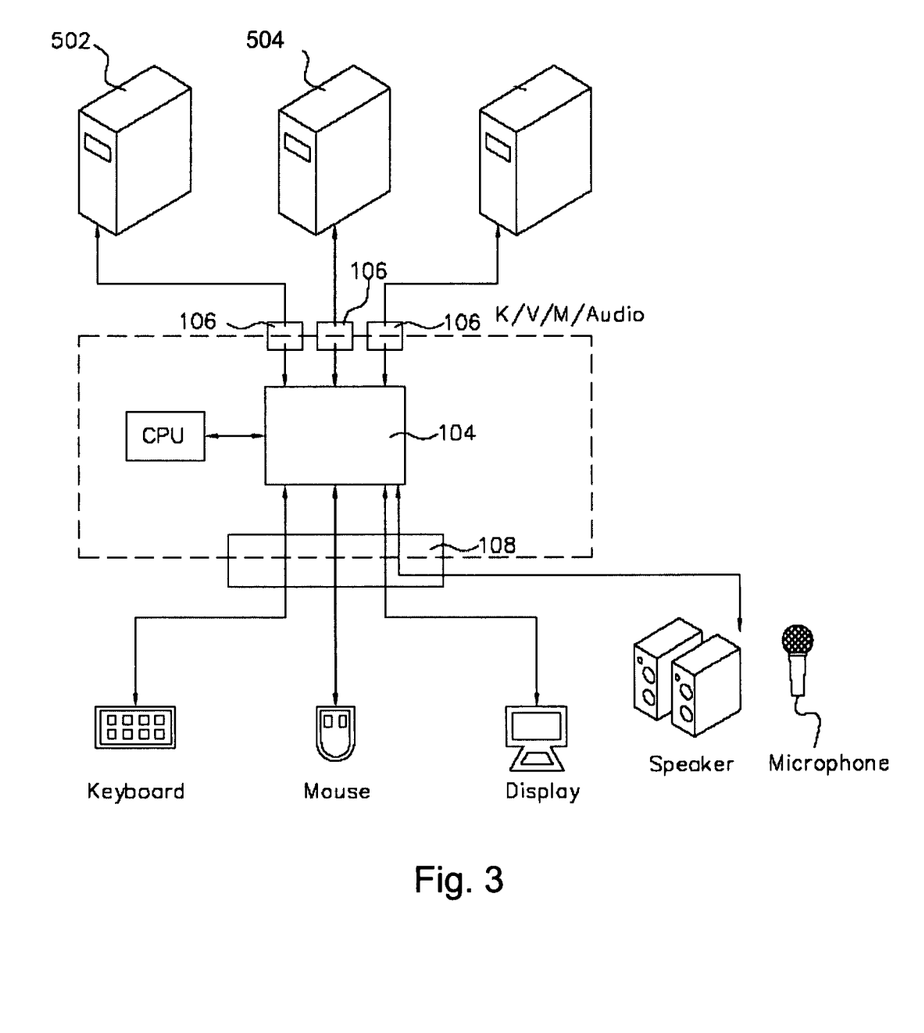
FIG. 3 illustrates an example of a switch circuitry in examples consistent with the present invention.

The switch circuitry 104 in the external housing 102 is configured for coupling to the input and output interfaces of the computers and configured for switching a set of input and output interface couplings to one of the computers, such as computer 502. An example of a set of input and output interface couplings may include a keyboard interface, a mouse or a pointing device interface, a display interface, and an audio interface. FIG. 3 illustrates an example of the switch circuitry 104 in examples consistent with the present invention. Referring to FIG. 3, the switch circuitry 104 may include switching devices coupled with a central processing unit (CPU) or a processor. The processor may be an embedded processor that operates based on a set of firmware codes, and the processor and or the switching devices may receive user commands through keyboard input, pointing device or mouse input, or a press of a button or buttons to determine when and how to switch the coupling of the set of the input and output interfaces 108 to one of the computers, such as computer 502. Examples of the processor may include W78E65 or W78E516 supplied by Winbond® (Winbond Electronics Corp.), and many other or commercially available processors can be used. In one example, the switch device may include circuitry made of transistors, such as MOS (metal-oxide-semiconductor) transistors, to control the connection of separate electrical couplings. Example of the switch device may include QS 3257 supplied by IDT® (Integrated Device Technology, Inc.) or PI5C3257 supplied by Pericom® (Pericom Semiconductor Corporation), and many other or commercially available switch devices may be used.

In some examples, some of the interfaces may share one common interface connector. For example, the keyboard interface and mouse interface may share one single USB (universal serial bus) connection or use two separate USB connections. The audio interface may include either or both of an audio input and audio output interfaces. Depending on the applications, other input and/or output interfaces, such as a storage device, a printer, a personal digital assistant (PDA), a cellular phone, a camera, etc., may be included or added. In some examples, the switch circuitry 104 may switch two or more sets of input and output interface couplings among two or more computers. In one example, the switch circuitry 104 may switch some of the input and output interface couplings separately or asynchronously from other input and output interface couplings. This may allow the user to operate one computer while another computer is accessing a storage device, printing a document, and/or playing or recording audio. Therefore, in one example, the switch circuitry 104 is configured for providing a selection of the computer peripheral interface connection asynchronously with a selection of at least one of the connections to the display interface, the input device interface, and the audio interface. As an example, the synchronous or asynchronous connection function and parameters such as the timing for switching may be set by a user through software driver, keyboard or mouse control, or other controls, such as buttons associated with the switch system 100. To provide system operability or a better user interface, the switch circuitry 104 or the switch system 100 may include an on-screen display circuitry that is configured for providing operational information of the switch circuitry to one or more of the second connector port 108 and one of the first connector ports 106.

Referring to FIG. 1, the first connector ports 106 may be mounted on the housing 102, and each of the first connector ports 106 may be coupled to the switch circuitry for providing a connection to one of the computers. In one example, each of the first connector ports 106 may provide couplings to multiple peripheral interfaces, such as input, display, audio, and other input or output interfaces. The second connector port 108 may also be mounted on the housing 102 and coupled to the switch circuitry 104 for providing some or all of the input and output interface couplings. In one example, the second connector port 108 may have one port or have two or more ports combined to provide multiple connections. The second connector port 108 may provide electrical contacts or connections to multiple devices, such as display device connection 108a, input device connection 108b, and audio device connection 108c. In some example, another input device connection 108d and/or another audio device connection 108e may be included optionally. In one example, the two input device connections may be separately coupled to a keyboard and a mouse. In another example, the two audio device connections may be separately coupled to a microphone and a speaker, a headset, or other audio output devices. In another example, an audio device connection may be coupled to one or both of an audio input and audio output devices.

In addition to the components illustrated above, the switch system may also include a switch interface coupled with the switch circuitry. The switch interface may allow a user to effect a selection of one of the computers a set of input and output interface couplings is coupled to. In some examples, the switch interface may include a number of interface selection buttons 110 at a front panel or a control panel of the interface switch system 100. In other examples, the switch interface may be a circuit in the external housing 102 or a part of the switch circuit 104 that is configured for processing keyboard, pointing device, or other input signals to effect a selection based on user input.

Figure 2A:
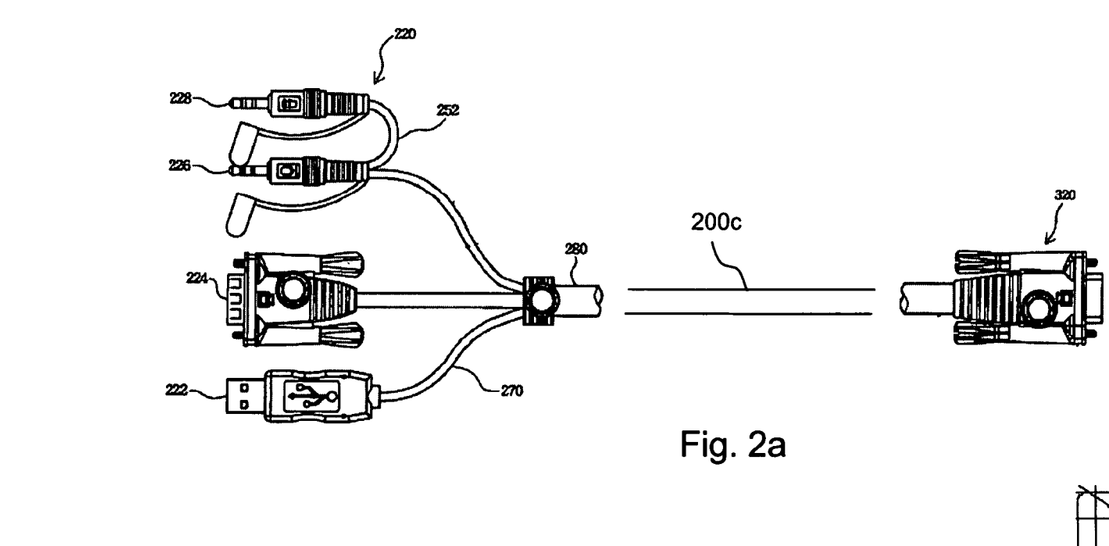
FIG. 2a illustrates a schematic diagram of a cable in examples consistent with the present invention.
Figure 2B:
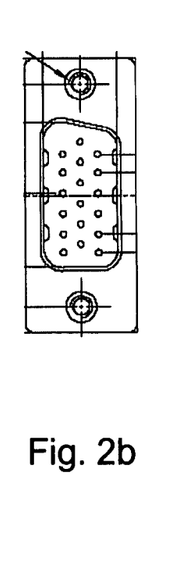
FIG. 2b illustrates a schematic diagram of a first end of a cable 200 in one example consistent with the present invention.

In one example, cables may be provided to couple the switch system with the computers. FIG. 2*a* illustrates a schematic diagram of a cable in examples consistent with the present invention. Referring to FIG. 2*a*, cable 200 may have two ends 320 and 220 with a conductive cable 200*c* providing conductive connections between the two ends. The first end 320 may have a first cable connector 320 configured for coupling to one of the first connector ports of the switch system. FIG. 2*b* illustrates a schematic diagram of a first end of the cable 200 in one example consistent with the present invention. Referring to FIG. 2*b*, the first end 320 may include 16 or more electrical contacts for providing connections to input or output interfaces, such as display, input device, and audio interfaces.

Referring to FIG. 2*a*, the second end 220 may have one or more connectors configured for coupling to the input and output interfaces the corresponding computer. For example, the second end 220 may include a number of connectors, such as the second, third, and fourth cable connectors, for different interfaces of the computer. In one example, the second may have three or more connectors. A second cable connector 222 may be configured for coupling to an input device port of one of the computers, such as a USB port for one or both of a keyboard and mouse interfaces or a PS/2 port for one or both of keyboard and mouse or pointing device interfaces. In other words, the input device port of the computer may be configured for receiving both keyboard and pointing device signals. In some examples, two separate PS/2 connectors may be used for the keyboard and mouse interfaces.

A third cable connector 224 may be configured for coupling to a video port of the computer; such as a VGA port. Depending on the design need of the switch system and switch system cables, the second connector port 224 may provide a coupling to a DVI interface, an HDMI interface, or a type of interface that transmits analog and/or video signals. A fourth cable connector 226 may be configured for coupling to an audio port of the computer. As an example, the audio port may transmit or receive digital and/or analog signals. In one example, the third connector may be a type of standard audio connector, such as a 3.5 mm audio plug offering two or more independent electrical contacts. Accordingly, depending on system or cable design, the cable may be configured for carrying keyboard signals, pointing device signals, one or both of digital and analog video signals, and one or both of digital and analog audio signals. In some examples, the connectors of the second end 280 may include two or more connectors from a display interface connector, an input device interface connector, an audio interface connector, and a peripheral device connector.

In many of traditional connector applications, some user may accidentally couple two connectors of different format together. The incorrect connection may cause malfunction of the switch system. In some example, a fool-proof design may be used to avoid an incorrect coupling. For example, referring to FIG. 1, one or more of the first connector ports may have a shape having one of an asymmetric trapezoid and symmetric trapezoid shape. Alternative, one or more of the first connector ports may have a shape having only two parallel edges with rounded corners. The two non-parallel edges may be designed in various manners to prevent an incorrect coupling. In some examples, a converter may be used to convert one or more of the first connector ports 106 to a converted interface having 15 or more electrical contacts. As an example, the converted interface may include one type of standard connectors, such as a fifteen-pin D-sub connector, a DB-15 connector, an HDB-15, or an SPHDB-15 manufactured by ATEN® (ATEN International Co., Ltd.), a DVI (digital video interface) connector, and an HDMI (high definition multimedia interface) connector.

Figure 4:
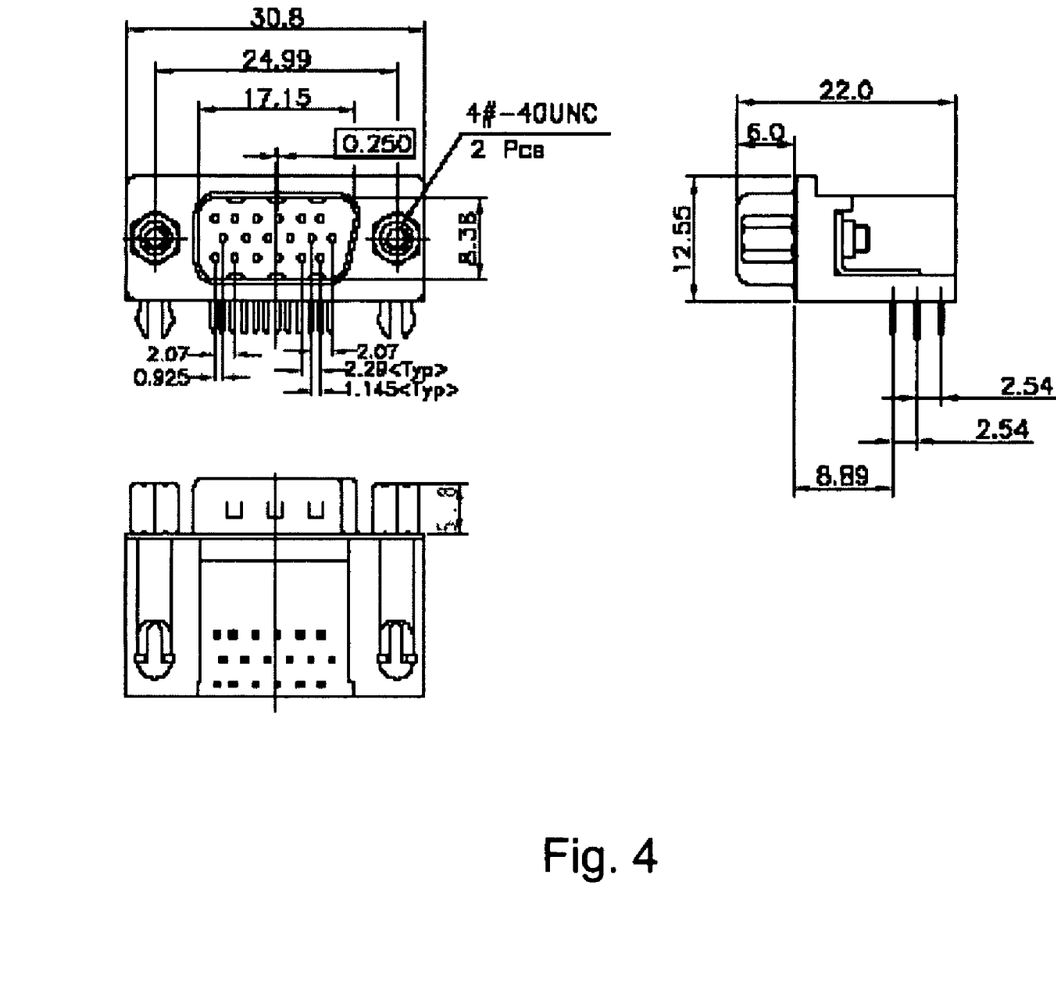
FIG. 4 illustrates a configuration for a first cable connector illustrated in three-way drawings in examples consistent with the present invention.

Referring to FIG. 2*b*, an example of the first end or first cable connector 320 is to provide sufficient number of electrical contacts, such as 16 or more electrical contacts, without occupying too much space. To limit the space occupied by the first cable connector 320, it can be designed to have no more than 24 electrical contacts. Additionally, the first cable connector 320 may have small enough area to allow 16 of the same connectors to be fit within the standard size of a back panel of one single server tray, also known as 1U. As an example, a standard single server tray has a height of approximately 1.75 inches and a width of approximately 19 inches. In one example, the first cable connector 320 has may be designed to occupy no more than approximately 12.55 mm in height and no more than approximately 30.8 mm in width. In other words, in some examples, the design illustrated here may increase the pin density of one or more connectors and provide a pin density that is higher than a typical DB-15 connector. FIG. 4 illustrates an illustrative example of one configuration for a first cable connector illustrated in three-way drawings. Referring, the dimensions for this particular configuration are marked in millimeters, and the dimensions are marked in their approximate values. Accordingly, those dimensions may be varied within a certain range can still work connectors with similar dimensions. Additionally, depending on the applications, all the dimensions may be significantly modified to fit various design needs. As an example, a design approximate the 12.55 mm by 30.8 mm total connector area in one example may allow 16 or more connectors to be fit within the standard size of a back panel of one single server tray and still leave enough room for other ports such as second connector port 108, a power port, and a communication port.

In one example, a first cable connector shown in FIG. 2*a*, FIG. 2*b* and FIG. 4 may include two or more groups of electrical contacts. Referring to FIG. 4 as an example, a first cable connector may include a group of first electrical contacts, at least one second electrical contact or a group of second electrical contacts, and a shield. In one example, the second group of contacts may include the left-most contact in the first and third rows and the right-most contact in the second row. The rest of the contacts, which include 15 contacts in this example, belong to the group of first electric contacts, which are divided and arranged in three rows. Each of the first electrical contacts in each of these three rows may be separated from each other with approximately the same pitch (first pitch), which may be approximately 2.29 mm in one example. The second electrical contact, may be separated from the closest first electrical contact with a smaller pitch (second pitch), which may be approximately 2.07 mm in one example. In this example, the second pitch is smaller than the first pitch. However, depending on the application, the second pitch can be equal to or larger than the first pitch. The shield surrounding the group of first electrical contacts and the second electrical contact may have a dimension of approximately 8.36 mm by 17.15 mm.

In some examples, a communication port may also be included. FIG. 1 illustrates an example of a communication port 112, which may be used to control the switch system or provide a communication interface between two or more switch systems.

Figure 5:
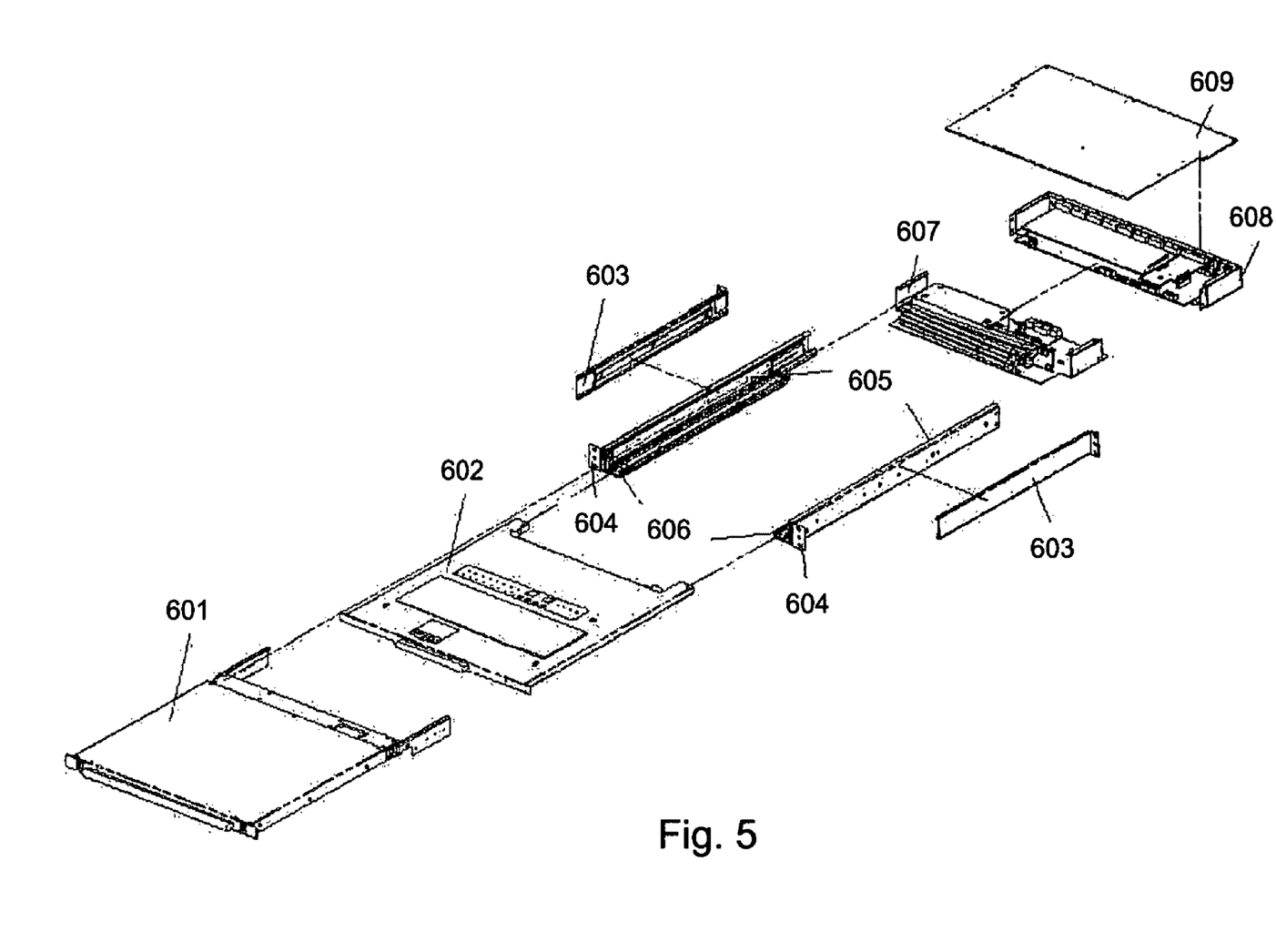
FIG. 5 illustrates a switch system having a base and a display in examples consistent with the present invention.
Figure 6:
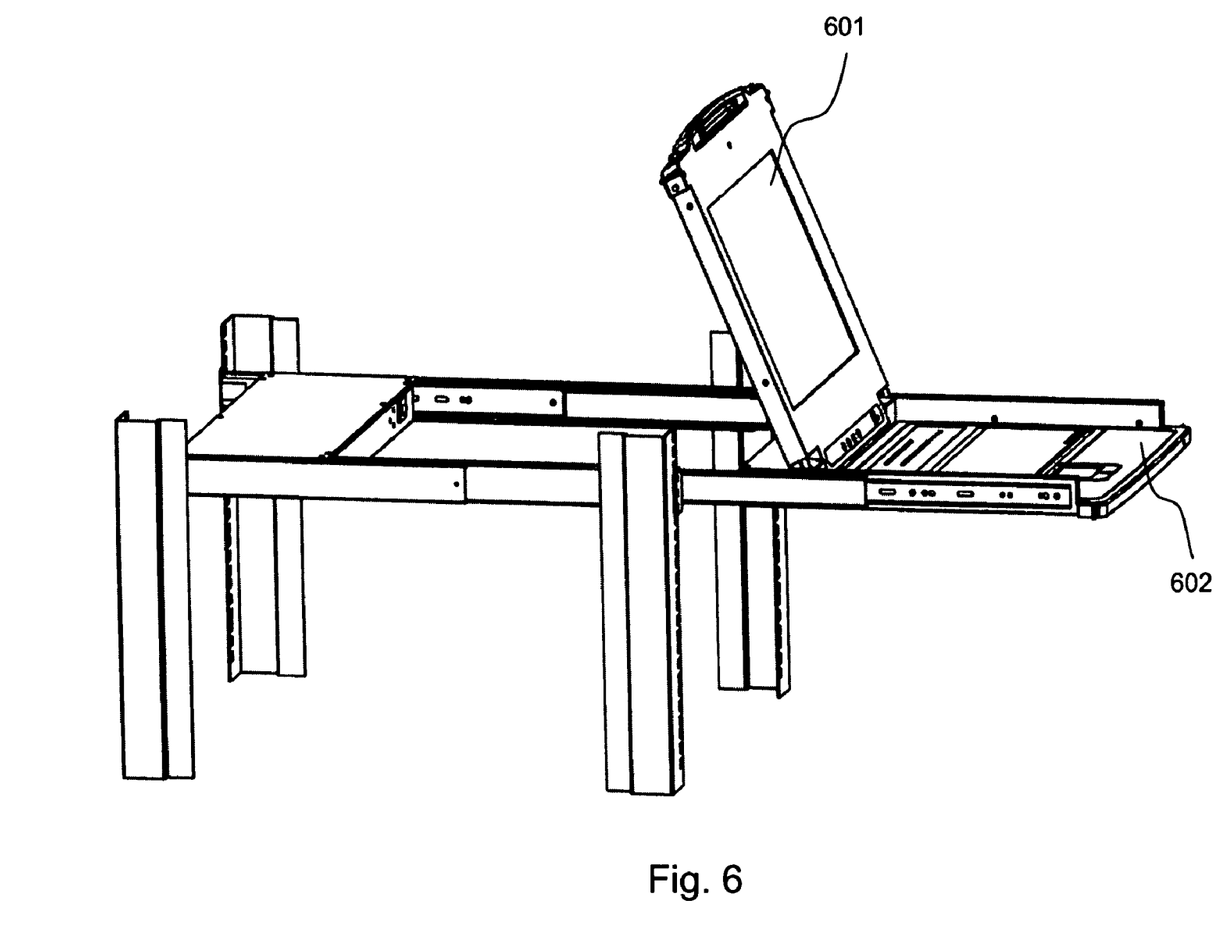
FIG. 6 illustrates another switch system having a base and a display in examples consistent with the present invention.

A typical rack for computer systems, such as common server racks, may have a standard height and/or width. For example, as noted above, each unit in a standard rack may have a height of approximately 1.75 inches and/or a width of approximately 19 inches. In one example, in one example, the switch circuitry may be partially or entirely enclosed in an external housing having no more than approximately 1.75 inches in height. And the switch system with a thin design of approximately 1.75 inches or less may still provide eight or more, and sixteen or more in some examples as illustrated in FIG. 1, first connector or connector ports mounted on the housing. Additionally, the switch system may also be designed to include a base and a display. FIG. 5 illustrates a switch system in an example that includes a base and a display, which in some applications are referred to as an LCD (liquid crystal display) KVM (keyboard-mouse-display) or an LCD KVM switch. Referring to FIG. 5, the switch system may include a base 602 having one or more input devices, such as a keyboard and a pointing device, mounted thereon. The system may also include a display 601 that may be pivotably mounted on the base 602 or on other portions of the system. FIG. 6 illustrates an example of a switch system having its display 601 pivotally mounted on the base 602. The display 601 may cover at least a part of the base 602 when the display 601 is in a closed position. Furthermore, the base may be slidably coupled to, and in communication with, the switch circuitry 607 such that the base 602 and the display 601 may be stored in a closed position or extended to an open position while the switch circuitry 607 remains in a fixed position.

Referring to FIG. 5, in one example, the switch circuitry 607 may be covered by an external housing having one or more parts, such as 608 and 609, which may be mounted on a rack 603. In some examples, the base 602 may be mounted to the rack 603 via a first set of sliding rails 606, and the display 601 may be pivotally mounted on a second set of sliding rails 605 slidably connected to the rack. In some designs, the first set of sliding rails 606 may be configured to be able to slide independently from the sliding movement of the second set of rails 605. In one example, additional components such as rail bases 603 may be provided to support two or more sliding rails. Additionally, the display 601 may still be configured for covering at least a part of the base 602 when the display 601 is in a closed position and being slidably connected to, and in communication with, the switch circuitry 607 such that the base 602 and the display 601 may be stored in a closed position or extended to an open position while the switch circuitry 607 remains in a fixed position.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A switch system comprising:
   switch circuitry configured for coupling to input and output interfaces of a number of computers, the switch circuitry being configured for switching a set of input and output interface couplings to one of the computers;
   an external housing for the switch circuitry;
   a number of first connector ports mounted on the housing, each of the first connector ports configured for coupling circuitry for providing couplings to the computers;
   each of the first connector ports having no less than sixteen and no more than twenty-two electrical contacts for providing couplings to a display interface, an input device interface, and an audio interface; and
   a second connector port mounted on the housing, the second connector port being coupled to the switch circuitry for providing the set of input and output interface couplings, the second connector port having electrical contacts for a display device, an input device, and an audio device;
   wherein each of the first connector ports is no more than 12.55 mm in height and no more than 30.8 mm in width.

2. The switch system of claim 1, further comprising a switch interface coupled with the switch circuitry for effecting a selection of one of the computers that the set of input and output interface couplings is coupled to.

3. The switch system of claim 1, further comprising a number of cables, each cable having:
   a first end having a first cable connector configured for coupling to one of the first connector ports, each of the first connector ports having no less than sixteen electrical contacts for providing connections to the display interface, the input device interface, and the audio interface;
   a second end having connectors configured for coupling to input and output interfaces of one of the computers.

4. The switch system of claim 3, wherein the connectors of the second end comprises:
   at least one second cable connector configured for coupling to at least one input device port of one of the computers;
   a third cable connector configured for coupling to a video port of the computer; and
   a fourth cable connector configured for coupling to an audio port of the computer.

5. The switch system of claim 4, wherein the at least one input device port of the computer has two separate ports configured for receiving respectively keyboard and pointing device signals.

6. The switch system of claim 3, wherein at least one of the cables is configured for carrying keyboard signals, pointing device signals, at least one of digital and analog video signals, and at least one of digital and analog audio signals.

7. The switch system of claim 3, wherein the connectors include at least two of a display interface connector, an input device interface connector, an audio interface connector, and a peripheral device connector.

8. The switch system of claim 1, wherein at least one of the first connector ports has a fool-proof design to avoid an incorrect coupling.

9. The switch system of claim 1, wherein at least one of the first connector ports has a shape having one of an asymmetric trapezoid and symmetric trapezoid shape or having two parallel edges with rounded corners.

10. The switch system of claim 1, wherein at least one of the first connector ports is configured for providing a computer peripheral interface connection.

11. The switch system of claim 10, wherein the switch circuitry is configured for providing a selection of the computer peripheral interface connection asynchronously with a selection of at least one of the connections to the display interface, the input device interface, and the audio interface.

12. The switch system of claim 1, further comprising a converter for converting at least one of the first connector ports to a converted interface having no less than fifteen electrical contacts, the converted interface includes at least one of a fifteen-pin D-sub connector, a DB-15 connector, an HDB-15, an SPHDB-15, a DVI connector, and an HDMI connector.

13. The switch system of claim 1, wherein the switch circuitry includes an on-screen display circuitry that is configured for providing operational information of the switch circuitry to at least one of the second connector port and one of the first connector ports.

14. A switch system configured for coupling to computers, the switch system comprises:
   switch circuitry configured for coupling to input and output interfaces of the computers, the switch circuitry being configured for switching a set of input and output interface couplings to one of the computers;
   a connector panel for mounting connectors thereon;
   a number of first connector ports mounted on the connector panel, each of the first connector ports being coupled to the switch circuitry for providing a connection to one of the computers;
   each of the first connector ports having no less than sixteen electrical contacts and no more than twenty-two electrical contacts for providing couplings to a display interface and an input device interface;
   a second connector port mounted on the connector panel, the second connector port being coupled to the switch circuitry for providing the set of input and output interface couplings, the second connector port having electrical contacts for a display device and an input device; and
   a switch interface coupled with the switch circuitry for effecting a selection of one of the computers that the set of input and output interface couplings is coupled to;
   wherein each of the first connector ports is no more than 12.55 mm in height and no more than 30.8 mm in width.

15. The switch system of claim 14, wherein each of the first connector ports is further configured for providing connections to an audio interface.

16. The switch system of claim 15, wherein the second connector port has electrical contacts for an audio device.

17. The switch system of claim 16, wherein the audio device comprises at least one of a speaker, a headset, or a microphone.

18. The switch system of claim 14, wherein at least one of the first connector ports is further configured for providing a computer peripheral interface connection.

19. The switch system of claim 18, wherein the switch circuitry is configured for providing a selection of the computer peripheral interface connection asynchronously with a selection of at least one of the connections to the display interface and the input device interface.

20. The switch system of claim 14, further comprising a converter for converting at least one of the first connector ports to a converted interface having no less than fifteen electrical contacts, the converted interface includes at least one of a fifteen-pin D-sub connector, a DB-15 connector, a HDB-15, a SPHDB-15, a DVI connector, and an HDMI connector.

21. The switch system of claim 14, wherein the switch circuitry includes an on-screen display circuitry that is configured for providing operational information of the switch circuitry to at least one of the second connector port and one of the first connector ports.

* * * * *